United States Patent [19]

Tanaka et al.

[11] Patent Number: 4,702,548

[45] Date of Patent: Oct. 27, 1987

[54] APPARATUS FOR SEPARATING OR SYNTHESIZING LIGHT SIGNALS

[75] Inventors: Masao Tanaka; Okosu Watanabe; Koichi Inada, all of Chiba, Japan

[73] Assignee: Fujikura Ltd., Tokyo, Japan

[21] Appl. No.: 696,448

[22] Filed: Jan. 30, 1985

[30] Foreign Application Priority Data

Feb. 29, 1984 [JP] Japan .................. 59-37691

[51] Int. Cl.⁴ ............................. G02B 6/28
[52] U.S. Cl. ................ 350/96.15; 350/316; 350/96.16; 370/3
[58] Field of Search ............ 350/96.15, 96.16, 311, 350/313, 316, 317, 407, 408; 370/1, 3

[56] References Cited

U.S. PATENT DOCUMENTS 3,704,061  11/1972  Travis .................. 350/408 X
4,474,424  10/1984  Wagner ................ 350/96.16
4,531,092  7/1985   Shibano ............... 350/408 X

FOREIGN PATENT DOCUMENTS 55-130514  10/1980  Japan .................. 350/96.16
56-137307  10/1981  Japan .................. 350/96.15

OTHER PUBLICATIONS

Miyauchi et al, "Compact Wavelength Multiplexer Using Optical-Fiber Pieces," *Optics Letters*, vol. 5, No. 7, Jul. 1980, pp. 321-322.

"Wavelength-Division-Multiplexing Technology (Invited)" by H. Ishio, Musashino ECL, NTT, Musashino, Japan, Jun. 1983.

"An Optically Accessing Loop System Using Pulse Interlace Technique" by N. Tokura, K. Oguchi and K. Nosu, Yokosuka ECL, NTT, Yokosuka, Japan, Jun. 1983.

"Design and Performance of Multi/Demultiplexer for Subscriber Loop System" by R. Watanabe, K. Sano and J. Minowa, Yokosuka ECL, NTT, Yokosuka, Japan, Jun. 1983.

*Primary Examiner*—John Lee
*Attorney, Agent, or Firm*—Blakely, Sokoloff, Taylor & Zafman

[57] ABSTRACT

First and second dielectric multilayer film filters are disposed along a straight optical axis and inclined about 45° with respect thereto. The second filter is rotated about the optical axis by a predetermined angle with respect to the first filter so as to divide a path of light incident upon or emitting from the first filter into a first path of light transmitting through the first and second filters, and a second path of light reflected by the first filter. The second path is orthogonal to the first path. The apparatus is used for separating or synthesizing light signals.

4 Claims, 7 Drawing Figures

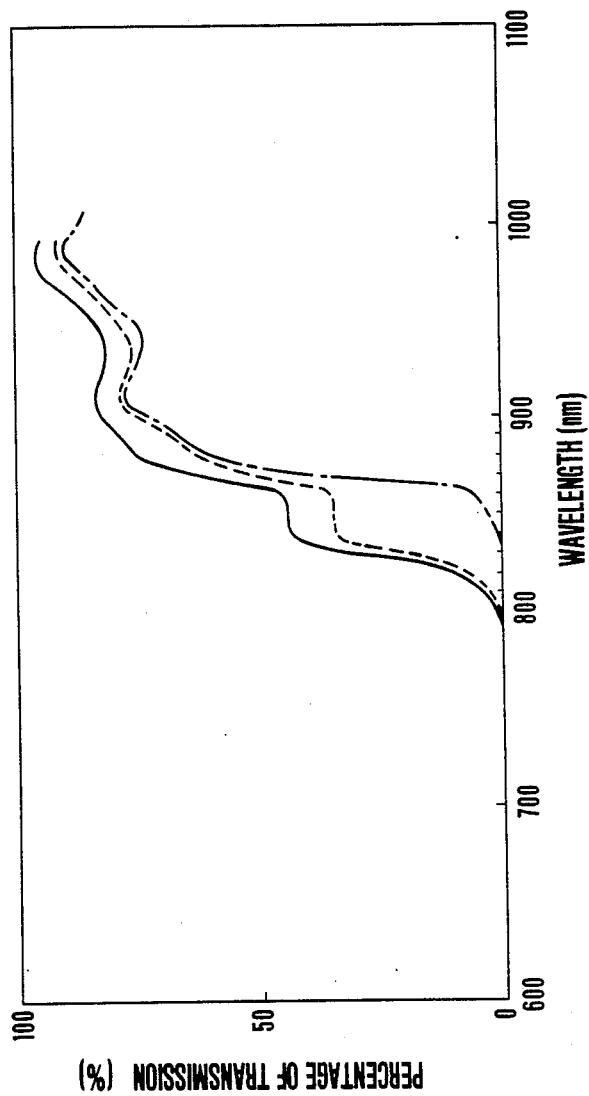

4,702,548

APPARATUS FOR SEPARATING OR SYNTHESIZING LIGHT SIGNALS

BACKGROUND OF THE INVENTION

This invention relates to apparatus for separating or synthesizing two or more light signals having different wavelengths.

In a wavelength multiplexed transmission system, a single core optical fiber line can be equivalently used as a line having two or more cores so that the versatility of the system is large. However, it is essential to synthesize or separate two or more light signals having different wavelengths. To this end, it is necessary to use a wave separater and a wave synthesizer.

The apparatus utilized in such system for separating or synthesizing optical signals generally employs a dielectric multilayer thin film filter (DMTF), but the DMTF has a polarized wave dependency caused by an incident angle. For this reason, it has been the practice to design the optical system such that its incident angle would be less than 22.5° in which the polarized wave dependency is small. For example, a DMTF 2 and a total reflection mirror 3 are bonded to opposing surfaces of a parallelogrammatic prism 1, as shown in FIG. 1, so as to parallely derive out light signals respectively having wavelengths of λ1 and λ2 while maintaining the incident angle to be less than 22.5°. Various other types of apparatus have been used, but in each of the prior art apparatus it is essential to use a prism or a mirror for the purpose of limiting the incident angle to be less than 22.5°. Moreover, as it is necessary to use special angles, the construction of the apparatus is complicated and expensive.

SUMMARY OF THE INVENTION

Accordingly, it is an object of this invention to provide an improved apparatus for separating or synthesizing optical signals thereby eliminating the adverse effect of polarized wave dependency, simplifying the construction and improving the mechanical accuracy of such apparatus.

According to this invention, there is provided an apparatus for separating or synthesizing light signals comprising first and second dielectric multilayer thin film filters which are disposed along a straight optical path and inclined about 45° with respect to an optical axis, the second filter being rotated about the optical axis by a predetermined angle with respect to the first filter so as to divide a light path of light incident upon or emitting from the first filter into a first path of light transmitting through the first and second filters, and a second path of light reflected by the first filter, the second path being orthogonal to the first path.

BRIEF DESCRIPTION OF THE DRAWINGS

In the accompanying drawings:

FIGS. 4A, 4B, 4C and 5 are graphs showing wavelength characteristics.

DESCRIPTION OF THE PREFERRED EMBODIMENT

Figure 1:
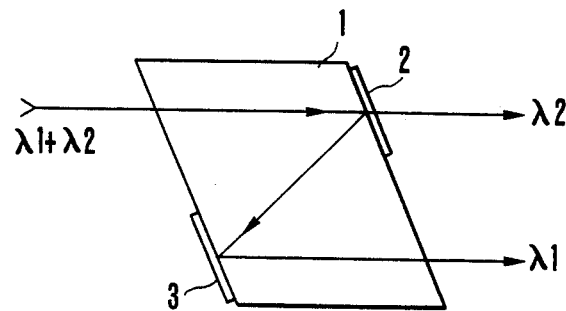
FIG. 1 is a diagrammatic representation showing a prior art wave splitter.
Figure 2:
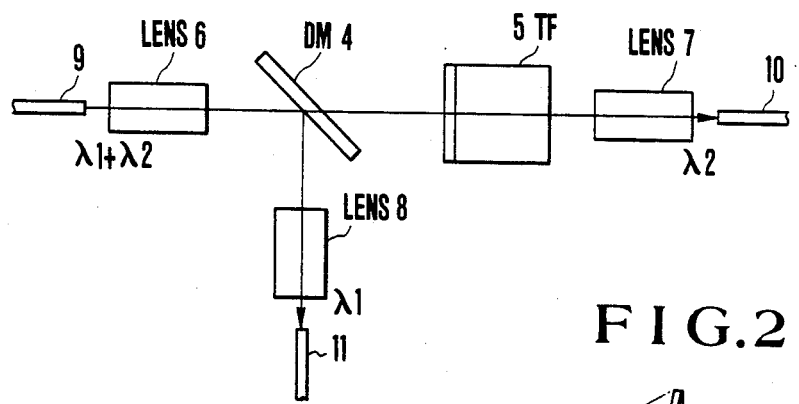
FIG. 2 is a diagrammatic representation showing a preferred embodiment of this invention.
Figure 3:
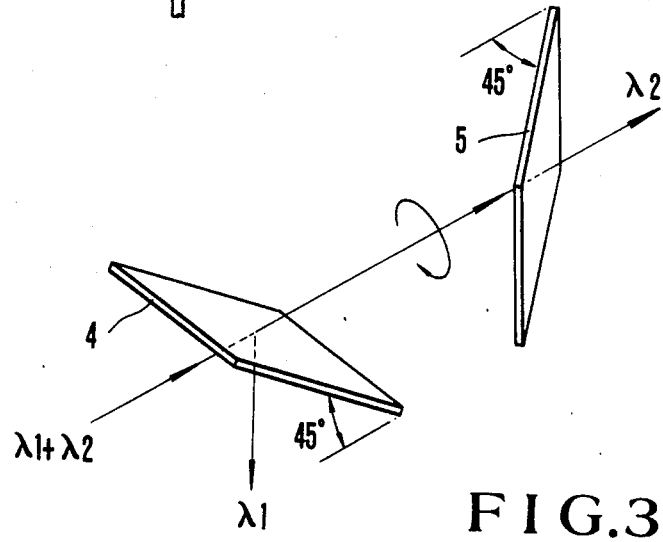
FIG. 3 is a perspective view showing relative position of a DMTF.

As shown in FIG. 2, two DMTFs 4 and 5 are disposed along an optical axis, and lenses 6, 7 and 8 acting as light signal input/output means are arranged such that the lens 6 guides light outputted from an optical fiber 9 to DMTF 4, that the lens 7 guides light transmitting through DMTFs 4 and 5 to an optical fiber 10 and that lens 8 guides light reflected by DMTF4 to an optical fiber 11. As shown in FIG. 3, each of the DMTFs 4 and 5 is inclined about 45° with respect to the optical axis so that a light signal impinges upon these DMTFs respectively at an angle of 45°. As shown, DMTFs 4 and 5 have their centers at the optical axis and DMTF 5 is rotated by 90° with respect to DMTF 4. Lens 6, DMTFs 4 and 5 and lens 7 are disposed on a straight line that is the optical axis, whereas the lens 8 is disposed at right angles with respect to the optical axis and inclined by about 45° with respect to DMTF 4 so as to receive the light reflected therefrom.

Figure 4A:
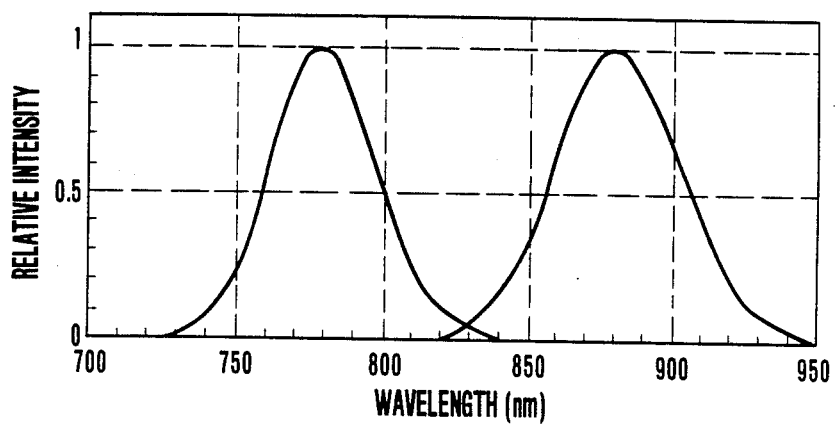
Figure 4B:
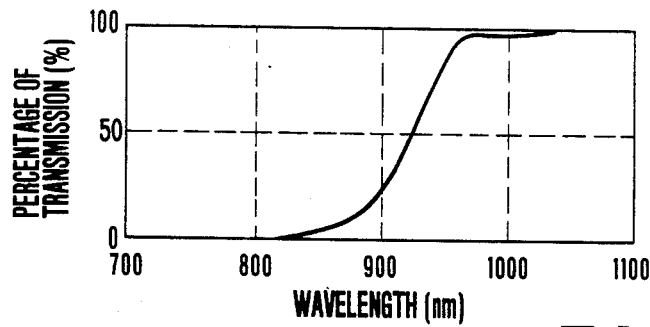
Figure 4C:
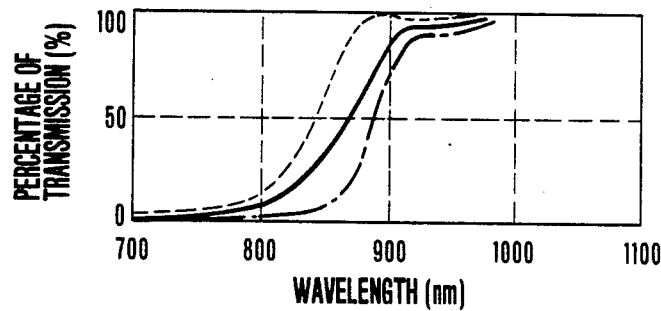

Suppose now that the optical fiber 9 outputs light synthesized from two light signals respectively having wavelengths of λ1 and λ2 (for example λ1=780 nm, an λ2=880 nm). The output light has wavelength spectra as shown in FIG. 4A. In this embodiment, filters passing light of long wavelengths are used as the DMTFs 4 and 5. The characteristic of each filter is usually shown by FIG. 4B. This characteristic shown in FIG. 4B was measured at an incident angle of less than 22.5° but when the incident angle becomes 45°, the characteristic would have polarized wave dependency so that the characteristic shifts toward a short wavelength side and its inclination becomes smaller as shown in FIG. 4C in which dotted lines show the characteristic for P polarized light, dot and dash lines that for S polarized light, and a solid line shows the characteristics of a vector sum of the characteristics shown by the dotted lines and the dot and dash lines. For this reason, with DMTF 4 alone, since its incident angle is 45°, of the light signal of λ1, a small quantity of the P polarized component will transmit, thus degrading separation of signals. Accordingly, the light transmitting through DMTF 4 is caused to pass through the second DMTF 5. Since this DMTF 5 too has an inclination angle of 45°, it has the same problem as DMTF 4. However, DMTF 5 is rotated 45° about the optical axis with respect to DMTF 4, the P polarized light transmitting through DMTF 4 is filtered according to the characteristic shown by the dot and dash lines in FIG. 4C, with the result that where two DMTFs 4 and 5 are used, separation of signals λ1 and λ2 can be improved.

Although in the foregoing example, DMTF 5 was rotated 90° about the optical axis with respect to DMTF 4, the spectrum characteristic can be varied by rotating 90° DMTF 5 about the optical axis from the same state as DMTF 4. More particularly, the light transmission percentage characteristic is shown by the solid line in FIG. 5 with only DMTF 4 alone, but when two DMTFs 4 and 5 are used the characteristic changes from the dotted line characteristic to the dot and line characteristic according to the angle of rotation of DMTF 5 about the optical axis. Dotted lines in FIG. 5 show a case wherein DMTFs 4 and 5 are at the same angle of rotation about the optical axis, and the dot and dash lines show a case wherein angles of rotations of DMTFs 4 and 5 are different by 90°. Accordingly, by adjusting the angle in accordance with difference between DMTFs 4 and 5, the difference can be compensated for, whereby the degree of freedom of selecting DMTFs 4 and 5 can be increased.

Although in the foregoing, the apparatus was used to separate light signals, where light signals are applied in the opposite direction, the apparatus can be used as a synthesizer of light signals, in which case the light signals transmitting through DMTF 5 are synthesized with the light signals of orthogonal incidence at DMTF 4 to be taken out in the direction of the lens 6. Furthermore, instead of separating out light λ1 in the direction of 90°, this light can be separated out in parallel with light λ2 after changing the direction of light λ1 by 90° by using a mirror or the like.

In the separating/synthesizing apparatus of this invention since the adverse effect of polarized wave dependency is eliminated while maintaining the incident angle to the DMTF at 45°, it is not necessary to use a prism, a mirror or the like, thus simplifying the optical system, improving reliability and decreasing the manufacturing cost. Moreover, the optical systems are disposed at angles of 45° and 90° so that it is easy to improve mechanical accuracy and performance.

What is claimed is:

1. An apparatus for separating light signals composed of light of a first wavelength and light of a second wavelength comprising:

first and second dielectric multilayer thin film filters substantially transparent to light of said second wavelength disposed with a spacing along a straight optical path and inclined by 45° with respect to the axis of said straight optical path, said first filter substantially reflecting light of said first wavelength from said straight optical path onto an optical path orthogonal to said straight optical path, and said second filter being rotated about said straight optical path by an angle in relation to said first filter so as to be substantially opaque to light of said first wavelength transmitted by said first filter along said straight optical path.

2. An apparatus according to claim 1, wherein said second dielectric multilayer thin film filter is rotated by 90° with respect to said first dielectric multilayer thin film filter.

3. An apparatus for synthesizing light signals composed of light of a first wavelength and light of a second wavelength comprising:

first and second dielectric multilayer thin film filters substantially transparent to light of said second wavelength disposed with a spacing along a straight optical path and inclined by 45° with respect to the axis of the said straight optical path, said first filter substantially reflecting light of said first wavelength from an optical path orthogonal to said straight optical path onto said straight optical path, and said second filter being rotated about said straight optical path by an angle in relation to said first filter so as to be substantially opaque to light of said first wavelength transmitted by said first filter.

4. An apparatus according to claim 3, wherein said second dielectric multilayer thin film filter is rotated by 90° with respect to said first dielectric multilayer thin film filter.

* * * * *